US009852428B2

(12) United States Patent
King et al.

(10) Patent No.: US 9,852,428 B2
(45) Date of Patent: Dec. 26, 2017

(54) BUSINESS UNIT OUTSOURCING MODEL

(75) Inventors: Nigel King, San Mateo, CA (US); David Bell, Livermore, CA (US); Peter Ryan, Chinnor (GB); Yinchi Huang, Fremont, CA (US); Sherry E. Mead, San Francisco, CA (US); Bryan K. Cooke, Danville, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 529 days.

(21) Appl. No.: 12/192,583

(22) Filed: Aug. 15, 2008

(65) Prior Publication Data

US 2009/0204416 A1 Aug. 13, 2009

Related U.S. Application Data

(60) Provisional application No. 60/956,901, filed on Aug. 20, 2007, provisional application No. 60/956,898, filed on Aug. 20, 2007.

(51) Int. Cl.
*G06Q 10/00* (2012.01)
*G06Q 30/00* (2012.01)

(52) U.S. Cl.
CPC .................................... *G06Q 30/00* (2013.01)

(58) Field of Classification Search
CPC .... G06Q 30/0261; G06Q 10/06; G06Q 10/00; G06Q 10/0631; G06Q 10/103; G06Q 10/06311; G06Q 10/067
USPC ........................................................ 705/1.1
See application file for complete search history.

(56) References Cited

U.S. PATENT DOCUMENTS

| | | | | |
|---|---|---|---|---|
| 6,072,493 | A | 6/2000 | Driskell | |
| 6,343,291 | B1 | 1/2002 | Goldman | |
| 6,473,794 | B1 * | 10/2002 | Guheen et al. | 709/223 |
| 6,626,959 | B1 | 9/2003 | Moise et al. | |
| 6,629,081 | B1 | 9/2003 | Cornelius et al. | |
| 6,668,253 | B1 | 12/2003 | Thompson et al. | |
| 6,925,468 | B1 | 8/2005 | Bobbitt et al. | |
| 6,985,901 | B1 | 1/2006 | Sachse | |
| 6,985,955 | B2 | 1/2006 | Gullotta et al. | |
| 7,167,855 | B1 | 1/2007 | Koenig | |
| 7,562,308 | B2 | 7/2009 | Pradhan et al. | |

(Continued)

OTHER PUBLICATIONS

U.S. Appl. No. 12/784,033, dated May 22, 2012, Non-Final Office Action.

(Continued)

*Primary Examiner* — Maria C Santos-Diaz
(74) *Attorney, Agent, or Firm* — Kilpatrick Townsend & Stockton LLP

(57) ABSTRACT

Tools for configuring enterprise applications. In an aspect, an enterprise application can be configured to account for relationships between multiple business units within an enterprise, including without limitation relationships between the business functions provided by various business units. In another aspect, the disclosed tools provide a framework for identifying and/or defining relationships between business units. The tools might also provide a user interface for a user to identify one or more business units and/or business functions and defines a relationship between them. Based on this definition, an enterprise application can be configured to account for this relationship.

17 Claims, 6 Drawing Sheets

(56) References Cited

U.S. PATENT DOCUMENTS

| | | | | |
|---|---|---|---|---|
| 7,650,633 | B2 | 1/2010 | Whitson | |
| 7,657,471 | B1 | 2/2010 | Sankaran et al. | |
| 7,693,844 | B1 * | 4/2010 | Bobbitt et al. | 707/999.1 |
| 7,712,127 | B1 | 5/2010 | Thompson et al. | |
| 7,823,189 | B2 | 10/2010 | Patrick | |
| 7,870,595 | B2 | 1/2011 | Finney et al. | |
| 2001/0034693 | A1 | 10/2001 | Farhat et al. | |
| 2001/0034704 | A1 | 10/2001 | Farhat et al. | |
| 2002/0026592 | A1 | 2/2002 | Gavrila et al. | |
| 2002/0046074 | A1 | 4/2002 | Barton | |
| 2002/0059404 | A1 | 5/2002 | Schaaf et al. | |
| 2002/0087344 | A1 | 7/2002 | Billings et al. | |
| 2002/0107792 | A1 | 8/2002 | Anderson | |
| 2002/0178119 | A1 | 11/2002 | Griffin et al. | |
| 2003/0028451 | A1 | 2/2003 | Ananian | |
| 2003/0055788 | A1 | 3/2003 | Sakuma et al. | |
| 2003/0078815 | A1 | 4/2003 | Parsons | |
| 2003/0097319 | A1 | 5/2003 | Moldovan et al. | |
| 2003/0158768 | A1 * | 8/2003 | Maeda | 705/7 |
| 2003/0182461 | A1 * | 9/2003 | Stelting et al. | 709/310 |
| 2004/0064351 | A1 | 4/2004 | Mikurak | |
| 2004/0098594 | A1 | 5/2004 | Fleming et al. | |
| 2004/0107131 | A1 | 6/2004 | Wilkerson et al. | |
| 2004/0162771 | A1 | 8/2004 | Tamatsu et al. | |
| 2004/0210528 | A1 | 10/2004 | Guion et al. | |
| 2005/0010429 | A1 | 1/2005 | Zipple et al. | |
| 2005/0108021 | A1 * | 5/2005 | Anderson et al. | 705/1 |
| 2005/0246215 | A1 * | 11/2005 | Rackham | 705/7 |
| 2006/0041505 | A1 | 2/2006 | Enyart | |
| 2006/0178918 | A1 | 8/2006 | Mikurak | |
| 2006/0190486 | A1 * | 8/2006 | Zhou et al. | 707/104.1 |
| 2006/0229896 | A1 | 10/2006 | Rosen et al. | |
| 2007/0027829 | A1 | 2/2007 | Graf | |
| 2007/0088730 | A1 * | 4/2007 | Mason et al. | 707/101 |
| 2007/0156500 | A1 * | 7/2007 | Merkel et al. | 705/9 |
| 2007/0174390 | A1 * | 7/2007 | Silvain et al. | 709/204 |
| 2007/0214497 | A1 * | 9/2007 | Montgomery et al. | 726/4 |
| 2007/0226090 | A1 | 9/2007 | Stratton | |
| 2008/0021716 | A1 | 1/2008 | Buss et al. | |
| 2008/0077530 | A1 * | 3/2008 | Banas et al. | 705/50 |
| 2008/0098485 | A1 | 4/2008 | Chiou | |
| 2008/0162249 | A1 | 7/2008 | Leventhal | |
| 2008/0205295 | A1 * | 8/2008 | Saba | 370/254 |
| 2009/0006113 | A1 | 1/2009 | Robertson et al. | |
| 2009/0024494 | A1 | 1/2009 | Walz et al. | |
| 2009/0063549 | A1 | 3/2009 | Bhatia et al. | |
| 2009/0183244 | A1 | 7/2009 | Saraf et al. | |
| 2009/0204416 | A1 | 8/2009 | King et al. | |
| 2009/0222297 | A1 | 9/2009 | Cao et al. | |
| 2009/0222366 | A1 | 9/2009 | Cao et al. | |
| 2010/0049573 | A1 | 2/2010 | Kantorova et al. | |
| 2010/0312747 | A1 | 12/2010 | Stolte et al. | |
| 2011/0099030 | A1 | 4/2011 | Besch et al. | |
| 2011/0288968 | A1 | 11/2011 | King et al. | |

OTHER PUBLICATIONS

U.S. Appl. No. 12/192,418, dated May 24, 2011, Non-Final Office Action.
U.S. Appl. No. 12/195,070, dated Jun. 20, 2012, Advisory Action.
U.S. Appl. No. 12/195,070, dated Mar. 30, 2012, Final Office Action.
U.S. Appl. No. 12/195,070, dated Sep. 28, 2011, Non-Final Office Action.
U.S. Appl. No. 12/192,583, dated Mar. 1, 2011, Non-Final Office Action.
U.S. Appl. No. 12/192,583, dated Aug. 15, 2011, Final Office Action.
U.S. Appl. No. 12/192,418, Final Office Action dated Aug. 9, 2013, 32 pages.
U.S. Appl. No. 12/192,418, Non Final Office Action dated Feb. 1, 2013, 34 pages.
U.S. Appl. No. 12/195,070, Final Office Action Response dated May 30, 2012, 16 pages.
U.S. Appl. No. 12/784,033, Advisory Action dated Mar. 7, 2013, 2 pages.
U.S. Appl. No. 12/784,033, Final Office Action dated Dec. 21, 2012, 19 pages.
U.S. Appl. No. 12/784,033, Non Final Office Action dated Sep. 11, 2013, 22 pages.
U.S. Appl. No. 12/784,033, Restriction Requirement dated Jan. 19, 2012, 7 pages.
Conditional Formatting, www.Ozgrid.com,http://www.ozgrid.com/Excel/conditional-formatting.htm, Nov. 25, 2005, pp. 1-2.
MS Excel: Change how empty cells are displayed in a pivot table in Excel 2003/XP/2000/97, www.techonthenet.com, Mar. 16, 2006, pp. 1-4.
U.S. Appl. No. 12/192,418, Non-Final Office Action dated Mar. 13, 2014, 50 pages.
U.S. Appl. No. 12/784,033, Final Office Action dated Mar. 10, 2014, 23 pages.
Bauer, Arbor ships first Microsoft Office compatible OLAP server, Business Wire, Dec. 5, 1994, 2 pages.
Hawley, Change the color of cells in the pivot table, http://www.ozgrid.com/forum/showthread.php?t=48003, post date Mar. 16, 2006, join date Jan. 24, 2003, pp. 1-2.
U.S. Appl. No. 12/784,033, Office Action dated May 22, 2012, 19 pages.
U.S. Appl. No. 12/192,418, Office Action dated May 24, 2011, 16 pages.
U.S. Appl. No. 12/195,070, Advisory Action dated Jun. 20, 2012, 3 pages.
U.S. Appl. No. 12/195,070, Final Office Action dated Mar. 30, 2012, 22 pages.
U.S. Appl. No. 12/195,070, Office Action dated Sep. 28, 2011, 19 pages.
White, Ron, "How Computers Work," 7th Edition, Oct. 2003, 65 pages, Que, Indianapolis, IN.
Non-Final Office Action for U.S. Appl. No. 12/192,418, dated May 24, 2011, 16 pages.
U.S. Appl. No. 12/192,418, Non-Final Office Action dated Dec. 18, 2014, 51 pages.
U.S. Appl. No. 12/195,070, Non-Final Office Action dated Apr. 2, 2015, 24 pages.
U.S. Appl. No. 12/784,033, Non-Final Office Action dated Mar. 25, 2015, 24 pages.
U.S. Appl. No. 12/195,070, Final Office Action dated Jun. 7, 2016, 28 pages.
U.S. Appl. No. 12/784,033, Non-Final Office Action dated Jun. 16, 2016, 31 pages.
U.S. Appl. No. 12/784,033, Final Office Action dated Sep. 17, 2015, all pages.
U.S. Appl. No. 12/784,033, Advisory Action dated Dec. 8, 2015, all pages.
U.S. Appl. No. 12/192,418,Final Office Action dated Jul. 13, 2015, 71 pages.
U.S. Appl. No. 12/192,418, Non-Final Office Action dated Aug. 11, 2016, 51 pages.
U.S. Appl. No. 12/195,070, Final Office Action dated May 7, 2016, 28 pages.
U.S. Appl. No. 12/192,418, Notice of Allowance dated Mar. 20, 2017, 28 pages.
U.S. Appl. No. 12/784,033, Final Office Action dated Feb. 21, 2017, 17 pages.

* cited by examiner

BUSINESS UNIT OUTSOURCING MODEL

CROSS-REFERENCE TO RELATED APPLICATIONS

This application is a non-provisional application claiming the benefit, under 35 U.S.C. §119(e), of provisional U.S. Patent Application No. 60/956,901, titled "Business Unit Outsourcing Model" and filed Aug. 20, 2007 by Nigel King et al.

This application may be related to provisional U.S. Patent Application No. 60/956,898, titled "Enterprise Structure Configurator" and filed Aug. 20, 2007 by Akash Bhatia et al.

This application may also be related to U.S. patent application Ser. No. 12/192,418 titled "Enterprise Structure Configurator" and filed on Aug. 15, 2008 by Akash Bhatia et al.

The entire disclosure of each of the above applications is incorporated herein by reference for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates to enterprise software applications in general and, more particularly, to tools for configuring enterprise software applications and/or for defining data structures for enterprise software applications.

BACKGROUND

Many businesses (and other organizations) use software applications (and/or suites of such applications) to organize their business affairs, track business performance, and/or the like. Such applications (referred to herein as "enterprise applications") are often quite complex, relying on numerous database tables to store and manage data for virtually every aspect of an organization's business. Merely by way of example, enterprise applications can include supply chain management ("SCM") applications that manage raw materials, work-in-process and/or finished products, coordinate with suppliers, and/or the like; customer relations management ("CRM") applications that are used to track, store and/or manage customer information; financial applications that track and/or analyze the financial performance of the organization; human resources applications that provide management of the human resources functions of the organization; and/or the like. In some cases, these enterprise applications are standalone applications; in other cases, a single enterprise application (and/or suite of applications) might provide some or all such functionality. One type of enterprise application is referred to enterprise resource planning ("ERP") software. Examples of enterprise applications include, without limitation, JD Edwards Enterpriseone™, PeopleSoft Enterprise™ applications, and the Oracle eBusiness Suite™, all available from Oracle Corporation.

For a variety of reasons, a modern business (or other organization) may be organized into several business units. (A "business unit," as that term is used herein, means any group within a business that is viewed as a discrete entity for one or more purposes, such as for operational/functional distinctions, for financial responsibility, for managerial reporting, for legal reporting, and/or the like.) In an aspect, especially from the perspective of an enterprise application, a business unit might perform a variety of business functions (which can be represented by functions within the enterprise application, such as a payroll function, an accounts payable function, a sales order function, etc.).

As enterprises have grown more accustomed to managing their affairs with enterprise applications, process efficiencies and greater internal controls have lead many large enterprises to establish shared service centers to support a number of internal clients. For example, the payroll function of a particular business unit might provide such services not only for that business unit, but for other units within the enterprise as well. Enterprise applications, however, generally have not been designed to be used by one business unit of an enterprise while servicing many others. In many cases, the enterprise application could not be deployed in a manner that would support such a configuration.

Moreover, even if the software could be deployed to support multiple internal clients from a single business unit, the setup of each business unit was independent. Enterprise applications failed to provide any expression of what parts of the business perform what functions on behalf whom. Thus, even where was possible to associate a user with a number of clients (e.g., other business units), the business unit for which the user worked was invisible in the assignment. This lack of structure also has made it difficult or impossible to implement or document administrative controls (such as service level agreements, SAS 70 internal control audits, and the like).

Hence, there is a need for more robust tools for identifying relationships between the various components of organizations, and/or for configuring enterprise applications to account for these relationships.

BRIEF SUMMARY

A set of embodiments provides tools for configuring enterprise applications. In an aspect of certain embodiments, an enterprise application can be configured to account for relationships between multiple business units within an enterprise, including without limitation relationships between the business functions provided by various business units. Merely by way of example, a first business unit might be a client of a second business unit with respect to a particular business function, such that the second business unit provides the business function for the first business unit. As but another example, a first business function in a first business unit might be related to a second business function in a second business unit, such that a transaction processed by the first business function subsequently should be processed by the second business function.

In one aspect, tools in accordance with various embodiments provide a framework for identifying and/or defining relationships between business units. In another aspect, the tools provide a user interface for a user to identify one or more business units and/or business functions and defines a relationship between them. Based on this definition, the tools of the invention may configure an enterprise application to account for this relationship. Merely by way of example, in one aspect, the tools provided by various embodiments might store, in a database used by the enterprise application, a set of data representing the relationship defined by the user. Advantageously, this configuration allows the enterprise application to determine how certain transactions should be processed. Merely by way of example, if a one business unit is a defined as a client of a second business unit with respect to a particular function, when the first business unit receives (or generates, etc.) a transaction that particular function, the transaction can be automatically provided to the second business unit for processing. As described in detail below, various embodiments provide other and/or additional functionality.

The tools provided by various embodiments, without limitation, methods, systems, and/or software products. Mainly by way of example, a method might comprise one or more procedures, any or all of which are executed by a computer system. Correspondingly, a computer system might be configured with instructions to perform one or more procedures in accordance with methods provided by various embodiments. Similarly, a computer program might comprise a set of instructions that are executable by a computer system (and/or a processor therein) to perform such operations. In many cases, such software programs are encoded on physical and/or tangible computer readable media (such as, merely by way of example, optical media, magnetic media, and/or the like). In a particular embodiment, the set of instructions might be incorporated within an enterprise application and/or might be provided as a separate computer program that can be used to configure the enterprise application.

For example, one set of embodiments provides computer programs (which may be stored on computer readable storage media). In one set of embodiments, a computer readable storage medium might have encoded thereon a computer program comprising a set of instructions executable by a computer system to perform one or more operations. The computer program might comprise a framework for defining a set of relationships between a plurality of business units. In an aspect, the framework might comprise a business unit definition that is used to define representations of a plurality of business units, a business function definition that is used to define one or more business functions, and/or a relationship definition tool that is used to define a relationship between one or more business units and one or more business functions.

The computer program, in some embodiments, further comprises a user interface to receive input from a user and/or display output to a user. Merely by way of example, the user interface might receive first input for selecting a first representation of a first business unit, second input for selecting a second representation of a second business unit, third input for selecting a business function, and/or fourth input for defining a relationship among the first business unit, the second business unit, and the business function. In addition, the computer program might also comprise a configuration engine for configuring an enterprise application to reflect the defined relationship among the first business unit, the second business unit and the business function.

Another set of embodiments provides methods, including without limitation methods for configuring an enterprise application. An exemplary method comprises providing a user interface for a user to define a relationship between a plurality of business units and/or receiving, e.g., via the user interface, an identification of a first business unit and/or a second business unit. The method might further comprise receiving, again perhaps via the user interface, a selection of a first business function of the first business unit and/or a definition of a business function agency relationship between the first business unit and the second business unit. In an aspect, the business function agency relationship pertains to the first business function. In some cases, the method further comprises storing, e.g., in a database, a set of data representing the business function agency relationship between the first business unit and the second business unit.

Another exemplary method for configuring an enterprise application comprises providing a framework for defining a set of relationships between a plurality of business units, the framework comprising a business unit definition that is used to define representations of a plurality of business units, a business function definition that is used to define one or more business functions, and a relationship definition that is used to define a relationship between one or more business units and one or more business functions. This framework, in some cases, is provided in a computer system.

The method, in an aspect, further comprises providing, e.g., from the computer system, a user interface for a user to define a relationship between a plurality of business units, and receiving, via the user interface, an identification of a first business unit and/or a second business unit, as well as a selection of a first business function of the first business unit and/or a definition of a business function agency relationship between the first business unit and the second business unit. In some cases, the method further includes receiving a definition of a control to be implemented with respect to the defined business function agency relationship. The method might further comprise configuring an enterprise application to reflect the business function agency relationship between the first business unit, the second business unit, and the first business function. Configuring the enterprise application, in an aspect, may comprise storing, e.g., in a database, a set of data representing the business function agency relationship.

Another set of embodiments provides computer systems. An exemplary computer system might comprise a database for storing data used by an enterprise application, one or more processors in communication with the database, and/or one or more computer readable storage media in communication with the one or more processors. In an aspect, the one or more computer readable storage media have encoded thereon a computer program comprising a set of instructions that are executable by the one or more processors to perform one or more operations. Merely by way of example, the set of instructions may be executable to perform one or more methods provided by various embodiments.

BRIEF DESCRIPTION OF THE DRAWINGS

A further understanding of the nature and advantages of various embodiments may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION

While various aspects of certain embodiments have been summarized above, the following detailed description illustrates exemplary embodiments in further detail to enable one of skill in the art to practice the described embodiments. In the following description, for the purposes of explanation, numerous specific details are set forth in order to provide a thorough understanding of the described embodiments. It will be apparent, however, to one skilled in the art that the other embodiments may be practiced without some of these specific details. In other instances, well-known structures and devices are shown in block diagram form. Several embodiments are described below, and while various features are ascribed to different embodiments, it should be appreciated that the features described with respect to one embodiment may be incorporated with another embodiments as well. By the same token, however, no single feature or features of any described embodiment should be considered essential to all embodiments, as other embodiments of the invention may lack such features.

In a general sense, certain embodiments provide tools that can be used, for example, within an enterprise application (and/or in conjunction with an enterprise application) to configure the enterprise application to properly account for relationships between various business units within an organization. (As used herein, an "organization," also referred to as an "enterprise," refers to any concern that is organized for a particular purpose. In many cases, an organization will be a for-profit or nonprofit corporation, or a collection of related corporations. An organization, of course, might comprise one or more unincorporated business forms as well.) In an aspect, the tools can be used to allow a user to input information about such relationships.

In another aspect, these tools can be used to apply this information in configuring, customizing, and/or implementing the enterprise application for use within the organization. In particular, some embodiments are used to configure the data structures used by the enterprise application to account for the organization's structural hierarchy. Merely by way of example, in a set of embodiments, the tools are designed to define a data structure used by the enterprise application (which might comprise generating and/or modifying a set of one or more database tables used by the enterprise application, and/or storing those tables on a storage medium) to facilitate and/or optimize the use of the enterprise application with the specific characteristics of the organization.

Figure 1:
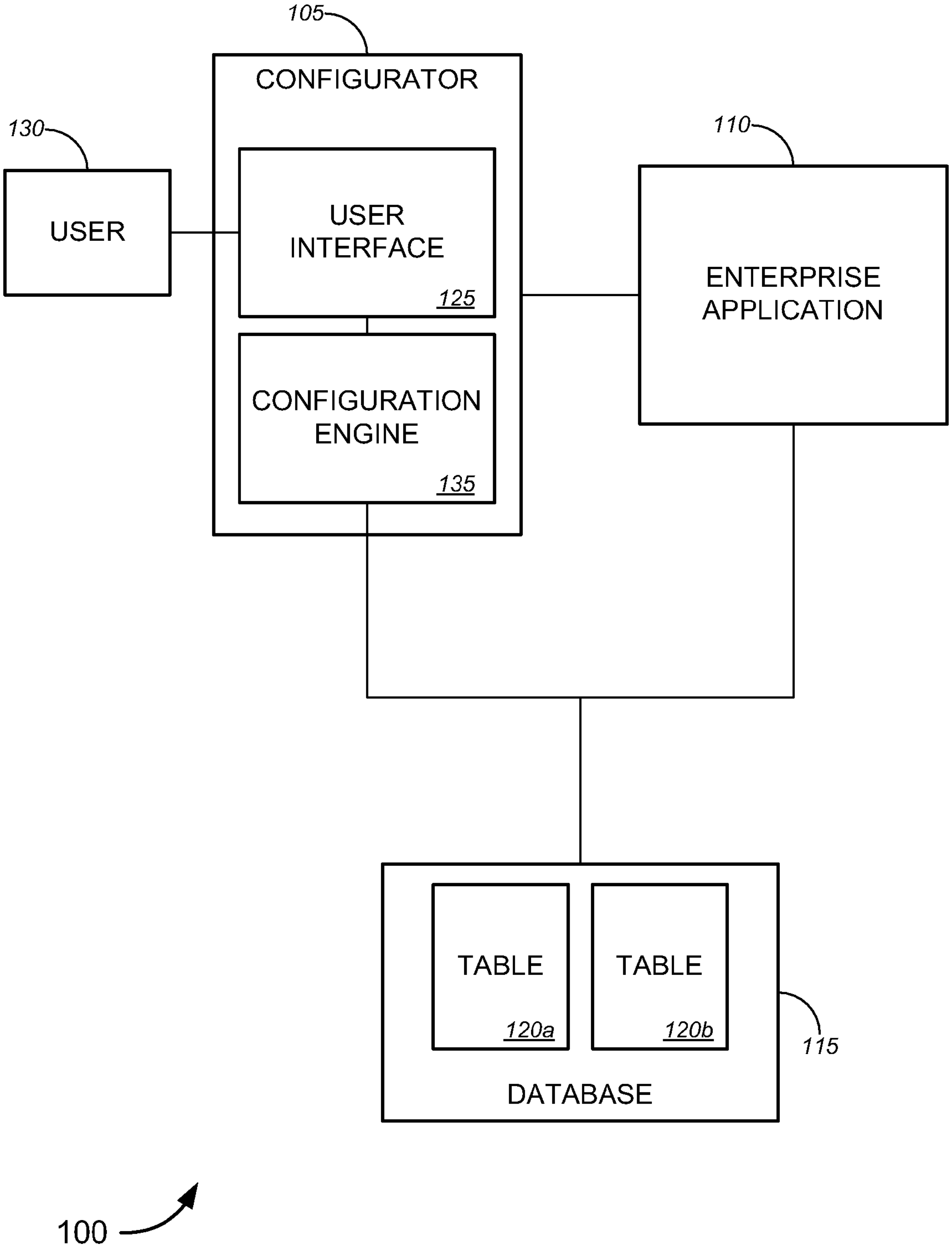
FIG. 1 is a block diagram illustrating software components of a system for configuring an enterprise application, in accordance with various embodiments of the invention.

One set of embodiments provides a software program, referred to herein as a "configurator." FIG. 1 illustrates the functional components of system 100 implementing such a configurator 105, in conjunction with an enterprise application 110. In some embodiments, the configurator 105 might be incorporated within the enterprise application 110. In other embodiments, the configurator 105 is a separate program from the enterprise application 110. In such cases, the configurator 105 might be, but is not necessarily, implemented within an installation and/or configuration utility for the enterprise application 110.

In some cases, the configurator 105 might include the functionality of the configurator described in commonly-assigned, copending U.S. patent application Ser. No. 12/192,418, filed on Aug. 15, 2008 by Bhatia et al. and entitled "Enterprise Structure Configurator" (the "Bhatia Application"), already incorporated herein by reference. Merely by way of example, in addition the functionality described herein, the configurator 105 might be enabled to define the structural hierarchy of an enterprise, as described in the Bhatia Application.

In many cases, the enterprise application 110 uses a database 115 to store data generated, used and/or maintained by the enterprise application 110. The database 115 typically is a relational database comprising one or more database tables 120 configured to store the data (e.g., as records, etc.). The configuration of these tables 120 can have a significant impact on the performance, features and/or usability of the enterprise application. Accordingly, in an aspect, the configurator 105 is designed to define and/or configure these tables 120, based, in part, on information about the business units in the enterprise, the business functions performed by the business units, and/or their relationships to one another.

In an exemplary embodiment, the configurator 105 comprises a user interface component 125 that is designed to interact with a user 130 (e.g., via a computer operated by the user). It should be appreciated that the configurator 105 (and, by extension, the user interface component 125) might be implemented in a variety of ways. Merely by way of example, the configurator 105 might be implemented as a web-based application, and the user interface component 125, accordingly, might be configured to provide interaction via a set of web pages (e.g., pages served by a web server, which might be integrated with, and/or separate from the configurator 105). In other embodiments, the configurator 105 might be configured to operate in a client-server configuration, or as a standalone application on a user computer (perhaps with facilities for communicating with the enterprise application 110 and/or database 115). Hence, the user interface component 120 might be configured to generate display screens (e.g., using tools provided by the operating system of the computer on which the configurator runs 105) for interaction with the user 125. One skilled in the art should appreciate, based on this disclosure, that there are many mechanisms for presenting a user interface to a user, and any of such mechanisms may be used in accordance with different embodiments of the invention.

In some embodiments, the configurator 105 also comprises a configuration engine 135, which is configured to communicate with the enterprise application 110 and/or database 115 to configure the enterprise application, e.g., to account for the relationships defined by the user via the user interface component 120 (as described in further detail below, for example). Merely by way of example, the data configuration engine 135 might be configured to modify and/or generate (e.g., create) one or more of the tables 120 and/or to create records in such tables 120 to reflect relationships among business entities within an enterprise (i.e., to configure the enterprise application to recognize the relationships and operate in accordance with the relationships, as described in further detail below). As another example, the configuration engine 135 might be configured to set one or more configuration parameters within the enterprise application itself 110 to reflect the relationships.

In an aspect, the configuration engine 135 may be configured to receive, from the user interface component 125, input provided by the user 130, and/or to configure the enterprise application 110 based, at least in part, on this input. As an example, in some cases, the enterprise application might be designed to maintain a table 120 (or set of tables) in the database 115 for each business unit in an organization. If the user indicates (e.g., via the user interface component 125) that a first business unit provides a business function for a second business unit, the configuration engine 135 might create two tables 120 (or two sets of tables, if appropriate) in the database 115. As another example, the enterprise application 110 might rely on a set of records in a particular table 120 in the database to represent relationships between various entities in an organization, and the configuration engine 135 might be configured to create appropriate records to reflect the relationships between two more business units and/or business function, based (at least in part) on input from the user. (It should be noted that these examples are provided for illustration only and should not be considered limiting with respect to the functionality of the data structure generator 135.)

In some cases, the configuration engine 135 is equipped with any necessary communication facilities and/or protocols for communicating with the database 115 and/or the enterprise application. Merely by way of example, the configuration engine 135 might be configured to generate structured query language ("SQL") commands and transmit those commands to the database (using, for example, the SQL.net transport protocol, Oracle Networking Services, etc.) for execution. As another example, the data structure generator 135 might be configured to access an application programming interface ("API") for the enterprise application 110 and/or database 115 to provide commands to configure the enterprise application 110. Any of a variety of communication protocols, including without limitation protocols within the TCP/IP suite, might be used by the configurator 105 (and/or components thereof) to communicate with users, other system components, and/or the like.

As noted above, in accordance with certain embodiments, various business units and/or business functions in an enterprise have relationships that can be represented within an enterprise application. As noted above, the term "business unit" in this document means any group within a business that is viewed as a discrete entity for one or more purposes, such as for operational/functional distinctions, for financial responsibility, for managerial reporting, for legal reporting, and/or the like. As used herein, the term "business function" refers to any function performed by a business unit and/or a discrete operational area of a business unit. A business function generally will comprise a collection of one more (typically related) services and/or tasks that are performed by the business unit (and/or, more specifically, by the business function). For example, an accounts receivable function might perform invoicing/billing tasks, funds collection/bookkeeping tasks, and/or the like—such tasks can also be considered services, which can be utilized (as described in further detail below) by different business units.

While such tasks are typically performed within a specific business function, in a more general sense, the business unit of which the business function is a part performs the tasks. Hence, this disclosure refers to a business function as performing a task or service, and also refers to a business unit as performing a business function (i.e., performing one or more tasks within the business function), often on behalf of another business unit, or in conjunction with the performance of a related business function by a different business unit. Within an enterprise, multiple business units might perform the same business function, on behalf of themselves or other business units.

A business function (and, in some cases, more specifically, the tasks or services provided by the business function) are often performed on, or with respect to, one or more transactions. Merely by way of example, in many cases, a business function (or task thereof) will generate a transaction. In other cases, the business function (or task thereof) will operate on an existing transaction (e.g., a transaction received from another business function). Collectively, these operations are described herein as "processing" a transaction; processing a transaction generally comprises any of a variety of operations that are performed with respect to the transaction, and the nature of the processing generally will depend on the type of transaction, as well as the business function and/or task that processes the transaction.

The term "transaction" is used broadly herein to refer to any unit of work that is to be performed by, or within, an enterprise application, and, in a particular aspect, by or on behalf of a particular business unit and/or business function. A transaction, therefore, might involve one or more database transactions (e.g., in a database that stores data used by the enterprise application), a request for a service to be performed, the performance of such a service, the generation and/or modification of data, etc.

Figure 2:
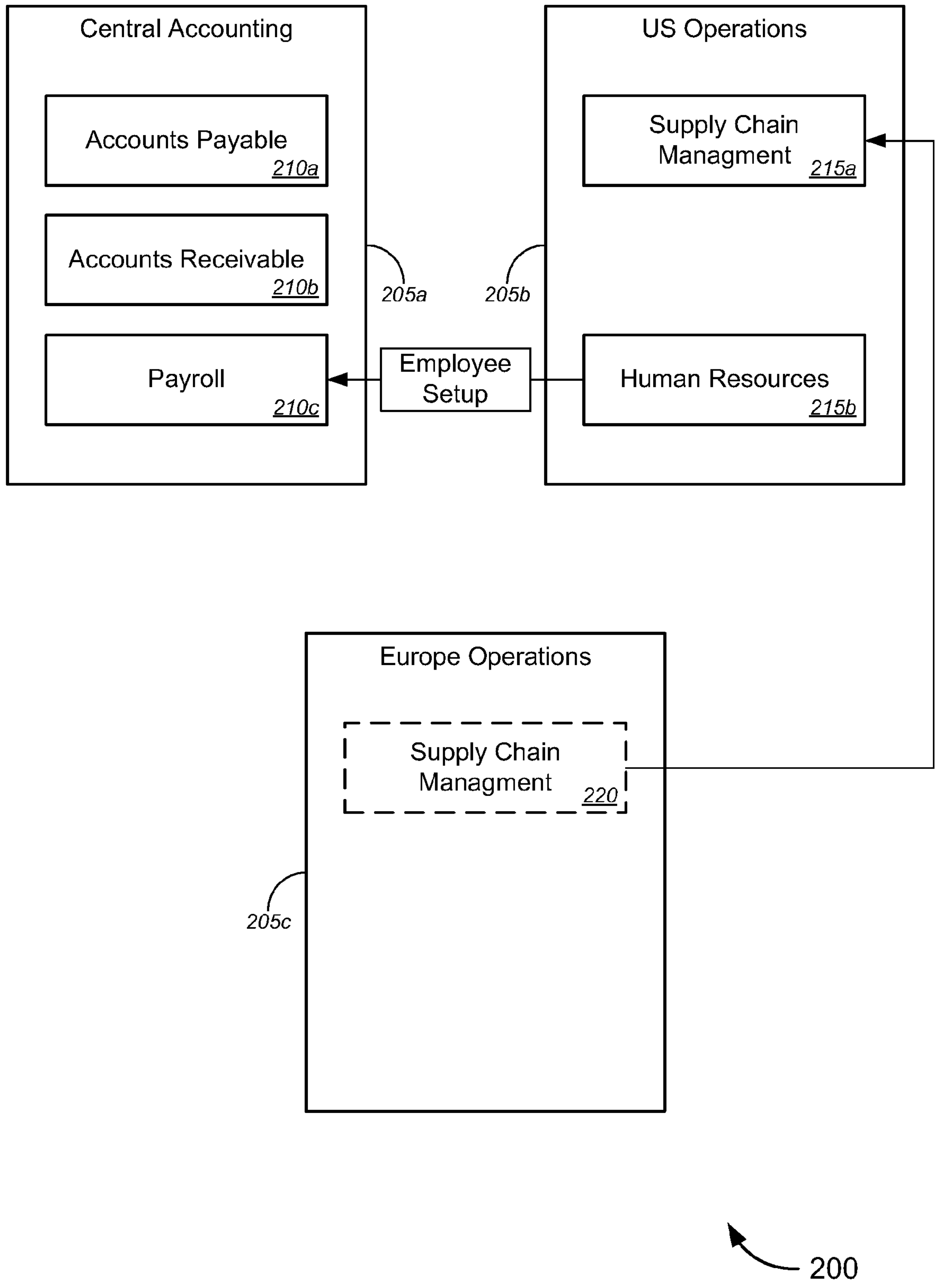
FIG. 2 is a block diagram illustrating relationships between a plurality of business units, in accordance with various embodiments of the invention.

To illustrate these concepts, FIG. 2 illustrates an arrangement 200 of several business units 205 and provides examples of a few of the many possible ways in which business units (and/or their business functions) can be related. Particular embodiments allow a user (such as an administrator, an implementer, a consultant, etc.) to provide input to capture such relationships—such input is used (e.g., by a configurator application) to create representations of the business units and their relationships, using the methods described below, for example. The representations of these relationships then can be used, in some cases, to configure an enterprise application to account for the relationships.

The arrangement 200 comprises three business units: a Central Accounting business unit 205*a*, a US Operations business unit 205*b*, and a Europe Operations business unit 205*c*. In the illustrated embodiment, the Central Accounting business unit 205*a* performs three business functions, an Accounts Payable function 210*a*, an Accounts Receivable function 210*b*, and a Payroll Function 210*c*. The US Operations business unit 205*b* performs two business functions, a Supply Chain Management function 215*a* and a Human Resources function 215*b*. The Europe Operations function 205*c* does not perform any business functions on its own. (It should be noted that these examples are necessarily incomplete, for brevity and ease of description; in implementation, it is likely that each business unit would perform several business functions. Hence, the business units and functions illustrated by FIG. 2 are merely illustrative in nature, and should not be considered limiting.)

In an aspect, two business units (or business functions) can be thought of as having a "business function agency relationship," in which one business unit (or a business function performed by that business unit) essentially acts as an agent or service provider for another business unit and/or function. The exemplary arrangement 200 illustrates two such agency relationships, although others are possible as well.

The first type of agency relationship illustrated by FIG. 2 is described herein as a "client" relationship, in which one business unit performs a business function on behalf of another business unit. Such relationships are common among large enterprises, but until now, enterprise applications have been unable to capture (i.e., properly represent) such relationships. In the illustrated example, the Europe Operations business unit 205*c* has a client relationship with the US Operations business unit 205*b*. Specifically, the Europe Operations business unit 205*c* outsources the Supply Chain Management function 220 to the US Operations business unit 205*b*, which performs the Supply Chain Management Function 215*a* on behalf of the Europe Operations business unit 205*c* (as well as on behalf of itself); in other words, the Europe Operations business unit 205*c* is a client of the US Operations business unit 205*b* with respect to the Supply Chain Management function 215*a*. (Accordingly, the Supply Chain Management function 220 is illustrated using broken lines to indicate that the European Operations 205*c* business uses that service, but does not perform the function itself.)

Another type of business function agency relationship is referred to herein as a "related business function" relationship. In this type of relationship, a business function in one business unit is related to a business function in another unit. For example, in some cases, after a first business function processes a transaction, a second business function (in the same or a different business unit) may be required to further process the transaction.

To illustrate a related business function relationship, consider the following example: In the arrangement 200 of FIG. 2, the Human Resources business function 215*b* processes an "Employee Setup" transaction, which might involve assigning the employee to a manager, provisioning an office, network identifier, phone, etc., and/or any of several other tasks. After the Human Resources function 215*b* processes the transaction, the Payroll business function 210*c* of the Central Accounting business unit 205*a* must process the transaction, in order to set up the required payroll records (e.g., salary records, W-4 records, benefits records, and the like) for the new employee. Accordingly, the Payroll function 210*c* and the Human Resources function 215 can be described as related business functions.

Tools in accordance with various embodiments allow such relationships (and others) to be captured by an implementer of an enterprise application, so that the enterprise application accounts for these relationships (for example, by routing transactions appropriately within the business application (e.g., to appropriate sub-applications, users, etc.)). In other words, the enterprise application can be configured to more closely model the actual business processes performed by the various business units within an enterprise.

In addition, one benefit of some embodiments is to enable the enterprise application, in some aspects, to implement process controls and/or metrics based on these relationships. Merely by way of example, once a relationship has been defined within an enterprise application, a service level agreement attached to the relationship can be defined within the application and/or measured by the application. For instance, in the example discussed above, if an enterprise application has defined a client relationship between US Operations business unit 205*b* and the Europe Operations business unit 205*c* (e.g., with respect to a Supply Chain Management business function 215*a*, as described above), a service level agreement can be defined (for example, that the US Operations business unit 205*a* will process supply chain transactions within 24 hours and provide monthly activity reports) within the enterprise application, and the performance of the US Operations business unit 205*b* can be measured against the agreed service levels. Other types of process controls, such as internal audits (e.g., SAS 70 audits and others) can be supported as well by the relationship definitions implemented by various embodiments of the invention.

Figure 3A:
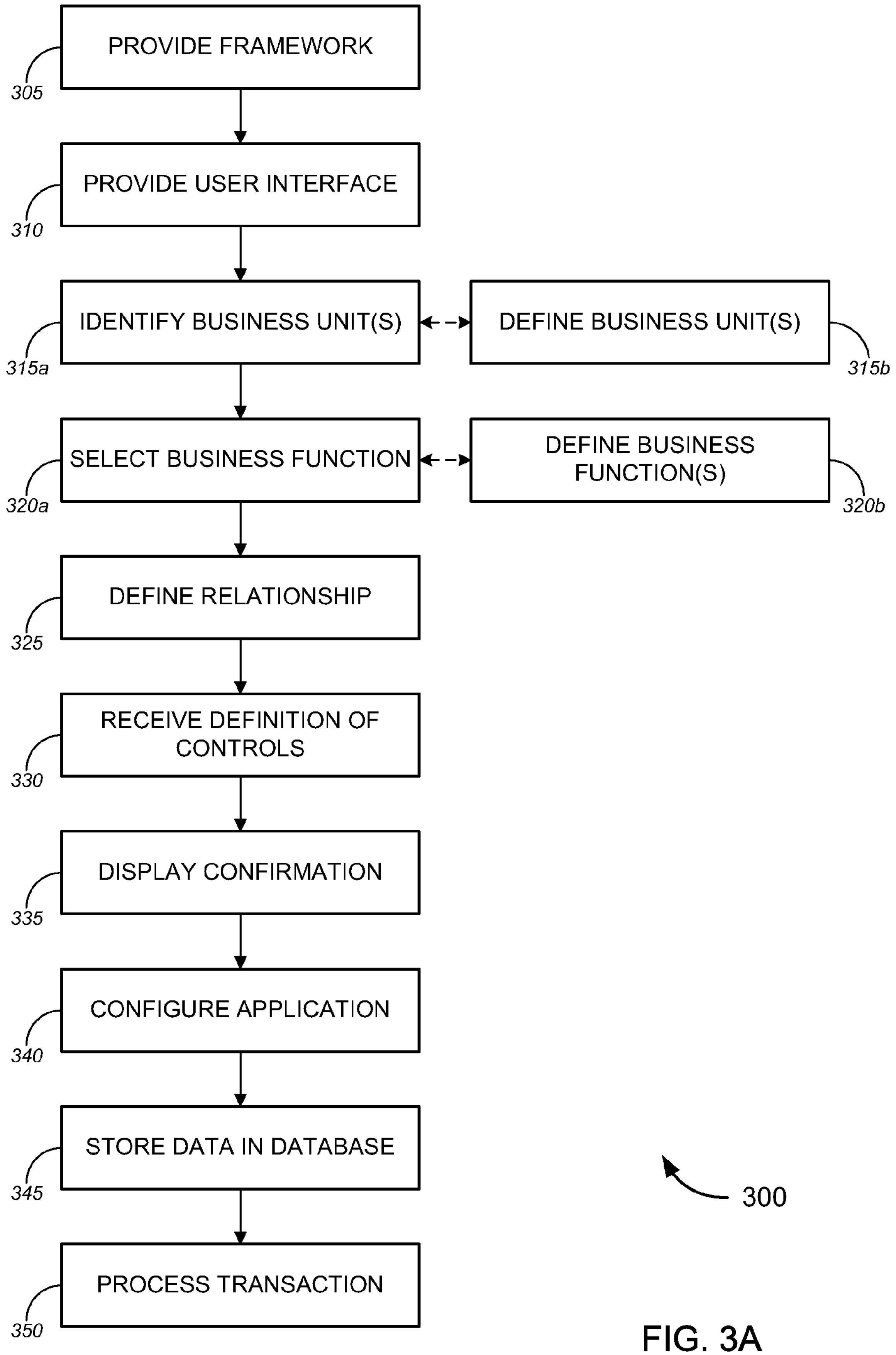
FIG. 3A is a process flow diagram illustrating a method of configuring an enterprise application, in accordance with various embodiments of the invention.

One set of embodiments provides methods for configuring an enterprise application, including without limitation configuring an enterprise application to account for relationships between various business units and/or business functions. FIG. 3A illustrates one such method 300 of configuring an enterprise application. In some embodiments, one or more procedures of the method 300 (as well as the methods 360 and 380 of FIGS. 3B and 3C, respectively) may be implemented by a software program, such as the configurator 105 described with respect to FIG. 1, and the method 300 therefore is described, in part, by reference to the system 100 illustrated by FIG. 1, although it should be appreciated that methods of the invention are not limited to any particular hardware or software implementation. Similarly, while the description of the methods 300, 360 and 380 of FIGS. 3A, 3B and 3C, respectively sometimes refer to the arrangement 200 of FIG. 2, it should be appreciated that these references are merely for illustrative purposes and are not intended to be limiting.

In some embodiments, the method 300 comprises providing a software framework for defining a set of relationships between a plurality of business units and/or business functions (block 305). Merely by way of example, the framework might comprise a business unit definition, which can be used to define a plurality of business units, and/or a business function definition that can be used to define business functions, as well as a relationship definition that is used to define a relationship between two or more of the business units and/or business functions. In an aspect, this framework provides a structure in which relationships can be defined in such a way that they can be represented within an enterprise application. Merely by way of example, the framework might provide a mapping between user input about various business units, functions and/or relationships and various database structures and/or application configuration parameters that are used to represent those business units, functions and/or relationships.

The method 300 may also comprise providing a user interface (block 310) for a user to define a relationship between one or more business units and/or business functions. In some cases, a user interface component of a configurator program might provide the user interface, as described above. Merely by way of example, the user interface might be configured to receive input from a user and/or to display output for a user. In some (but not all) embodiments, the user interface is provided as a set of one or more web pages. Alternatively and/or additionally, a third party application might be used to provide the user interface. In some cases, a combination of these procedures may be used.

The method 300 further comprises receiving (e.g., via the user interface) identifications of one or more business units for which a relationship is to be defined (block 315*a*). Merely by way of example, the configurator might present a list of business units that have been defined for a particular enterprise, and allow a user to select two or more such business units. In some cases, identifying a business unit might comprise defining the business unit itself (block 315*b*). A business unit can be defined in a variety of ways, such as by identifying the name of the business unit, identifying other characteristics of the business unit (geographical location, business functions performed, etc.) and/ or the like. In a particular aspect, defining a business unit might comprise defining the business unit's location within a structural hierarchy of the enterprise. Tools for defining a business unit in this fashion are described in detail in the Bhatia Application, already incorporated by reference, and such tools may be incorporated within some embodiments of the present invention.

The method 300 may further comprise providing for the user to select one or more business functions for which the relationship is to be defined, and/or receiving (e.g., via the user interface) such a selection (block 320*a*). In some cases, selecting a business function might comprise defining that business function (block 320*b*), e.g., via the user interface (and/or receiving input that defines the business function). The definition of a business function can comprise any of a variety of data, including without limitation, a name or label for the business function, an identification of a business unit that performs the business function, an identification of one or more transactions that are processed by the business function and/or the like.

At block 325, the method 300 comprises defining a business function agency relationship between the identified business units and/or selected business functions. More specifically, in some cases, the method 300 comprises receiving a definition of such a relationship (and/or input defining the relationship). Merely by way of example, the configurator might provide a user interface for the user to specify which type (of several possible types) of business function agency relationship exists between the identified business units and/or functions, as well as, in some cases, defining a type of transaction to which the relationship applies and/or information specific to the selected type of relationship (e.g., which business unit is the client and which is the provider, which business function is to perform additional processing for which other business function etc.). In some cases, these relationships can be defined at the time a business unit and/or business function is defined (e.g., at blocks 315*b* and/or 320*b*, described above).

As noted above, certain embodiments of the invention can support and/or facilitate the use of service level agreements and other controls. In some cases, this can include allowing a user to define (i.e., provide details) about specific controls to be implemented with respect to a particular business function agency relationship. Hence, the method 300, in an embodiment, includes receiving a definition of a control pertaining to the defined relationship (block 330). Merely by way of example, the user interface might provide a set of one or more fields to allow the user to specify the details about a control, such as a service level agreement. Such details can include, without limitation, time and/or other performance requirements (e.g., how quickly and/or in what manner a business function must be performed for a client business unit, etc.), reporting requirements (e.g., when reports about the control should be generated, perhaps automatically by the enterprise application, etc.), and/or the like. In another embodiment, the user interface might be configured to allow the user to submit a document that provides such details (in such cases, the configurator might be configured to parse the document to ascertain the details and/or simply to store the document and/or the details for future reference, e.g., by officials at the relevant business units).

Another possible type of control is a control on the nature of the business function agency relationship itself. For example, the configurator might allow a user to set a limitation on the number and/or type(s) of business units that can perform a business function on behalf of a client business unit. Based on the disclosure herein, one skilled in the art will appreciate that there are a variety of controls that can be implemented in this fashion, and that the details provided with vary by embodiment and/or by the nature of the control(s) implemented.

In some cases, a confirmation of the defined relationship may be displayed for the user (block 335), e.g., by displaying a list of the selected business units and/or functions and the type of relationship between them (optionally including any defined controls). Among other things, this can give the user an opportunity to review the relationship before committing it. At block 340, the enterprise application is configured (e.g., by a configuration engine, etc.) to reflect the defined business function agency relationship. As noted above, configuring the enterprise application can comprise a variety of procedures. Merely by way of example, in some cases, configuration parameters in the enterprise application may be set to reflect the defined relationship.

In other cases, the enterprise application might be configured to obtain such configuration information from a database. Hence, in some embodiments, a set of data representing the defined relationship may be stored in a database (block 345), which might reside on a computer readable storage medium (i.e., a hard disk drive, an array of drives, a storage area network, an optical drive, etc.). Merely by way of example, as noted above, a relationship may be represented by one or more records and/or tables in a database, and such records and/or tables may be written to a database (and/or if they already exist, modified as appropriate) to provide the necessary information for the enterprise to account for the defined relationship.

Figure 3B:
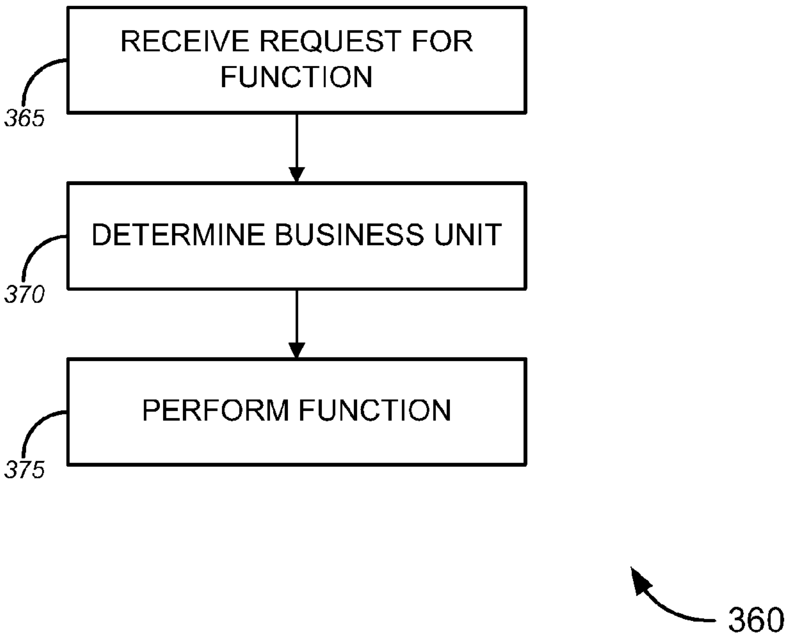
FIGS. 3B and 3C are process flow diagrams illustrating methods of processing transactions within an enterprise application, in accordance with various embodiments of the invention.
Figure 3C:
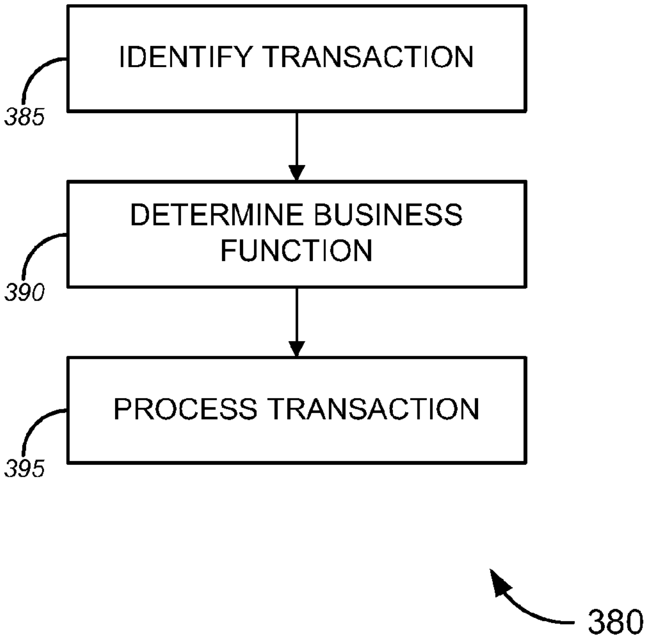

In some cases, the method 300 further includes processing a transaction, according the defined business function agency relationship (block 350). There are many ways in which a transaction can be processed in this manner. FIGS. 3B and 3C illustrate but two examples of how such processing can occur. In general, however, processing a transaction often will comprise determining (e.g., based on data stored in a database and/or configuration parameters, as described above) that a business function agency relationship governs the processing of the transaction, and then processing the transaction in the fashion specified by data stored about the applicable business function agency relationship.

Merely by way of example FIG. 3B illustrates a method 360 for processing a transaction in accordance with one set of embodiments. In an aspect, the method 360 can be used to process a transaction to account for a client relationship between two business units. The method 360 comprises receiving a request for a particular business function to be performed for a particular business unit (or, more specifically, in some cases, a request to have a particular business function perform a service) (block 365). In some cases, the request might comprise a transaction generated by (or received by, etc.) a particular business unit within the enterprise application; the transaction might need to be processed by a particular business function, such that the existence of the transaction might indicate to the enterprise application that the business function is needed. In other cases, a user, application component, etc. might request a service from a business function.

At block 370, the enterprise application (and/or a component thereof) determines that a particular business unit provides the business function for the business unit from which the request originates (i.e., that the requesting business unit is a client of the particular business unit). In an aspect, this determination is made based on configuration data provided by a configurator (e.g., based on data stored in a database, on configuration parameters, etc.). Such data can be generated and/or provided, for example, using the method 300 described above. The enterprise application then provides for the appropriate business unit to perform the requested function (and/or, more specifically, for the business function within the business to perform the task or service for which it was requested). For example, the enterprise application might route the request to the appropriate business unit and/or business function, might automatically process the request with the appropriate business function, etc.

FIG. 3C illustrates another example of a method 380 that can be used to process a transaction based on configuration information about business function agency relationships. In particular, the method 380 can apply to related business function relationships, described in further detail above. The method 380 comprises identifying a transaction that has been processed by a particular business function (block 385). In the field of enterprise applications, there are a number of tools available for identifying a processed transaction (including workflow frameworks, event notification frameworks, and the like), and any of such tools may be used in accordance with various embodiments of the invention.

The method 380 further comprises determining that the transaction should be further processed by a second business function (as, for example, in the "employee setup" example described above with respect to FIG. 2). In some cases, for example, the enterprise application might receive and/or generate an event notification when a transaction is completed, and, this notification might trigger a lookup to determine whether the transaction requires further processing. Alternatively and/or additionally, a transaction might be defined as requiring such additional processing, such that the enterprise application automatically determines, based on the nature of the transaction, that the additional processing is required and/or appropriate. In a particular set of embodiments, this determination is based on configuration data (e.g., data generated and/or stored by a configurator, as described above), which also indicates the business function and/or business unit that should provide the additional processing. The method 380, then, further comprises providing for the appropriate business unit to process the transaction (block 390), e.g., by performing the appropriate business function and/or providing the required service using the appropriate business function.

In conjunction with the methods 360, 380 illustrated by FIGS. 3B and 3C, respectively, any defined controls (such as the controls defined at block 330 of FIG. 3A, described above) may be implemented by the enterprise application. Such controls may influence the performance of a function and/or the processing of a transaction (e.g., by preventing a transaction prohibited by a control, by monitoring and/or reporting on the performance of a function and/or processing of a transaction, in accordance with a service level agreement, and/or the like).

Figure 4:
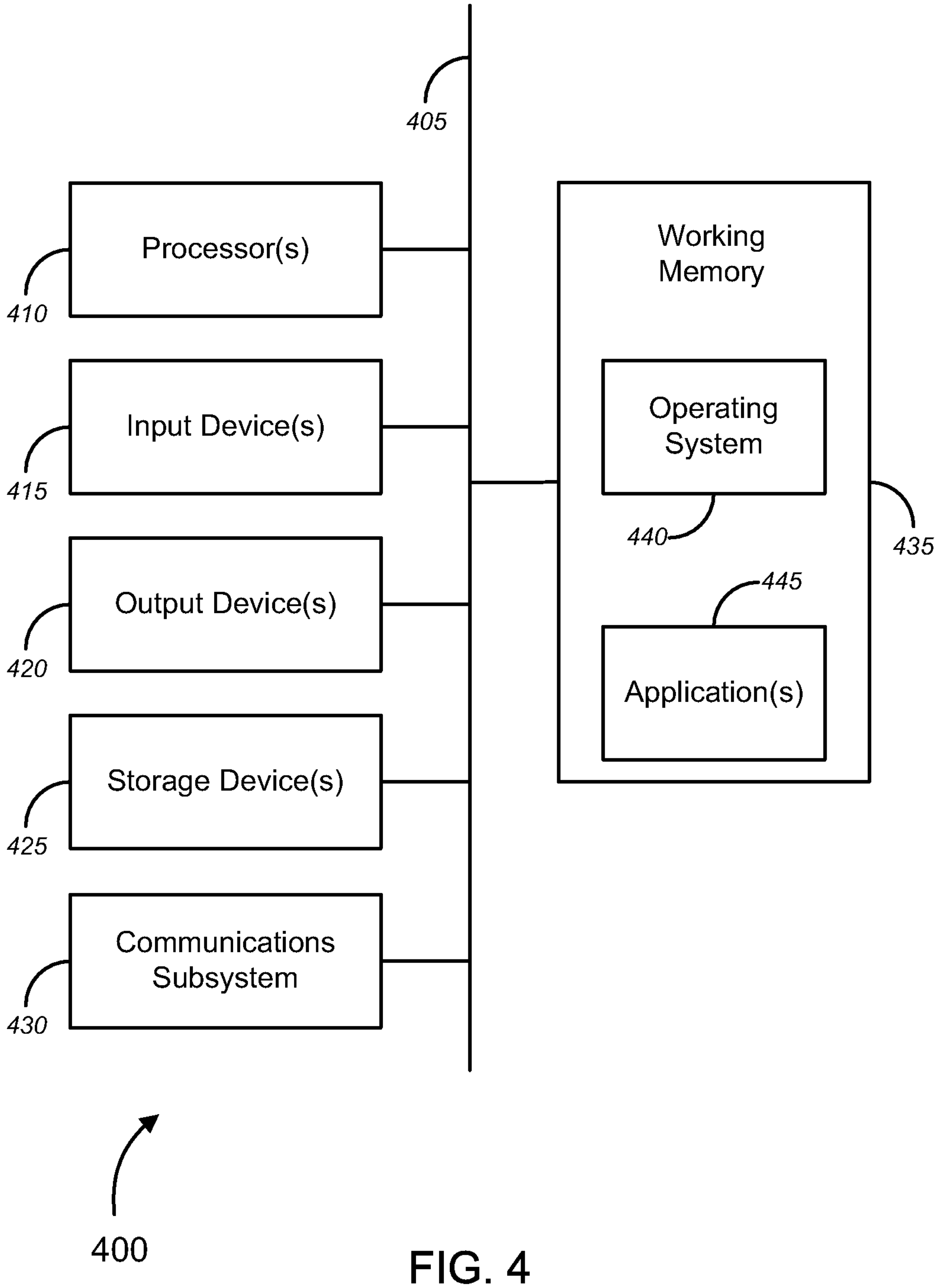
FIG. 4 is a generalized schematic diagram illustrating a computer system that can be used in accordance with various embodiments of the invention.

FIG. 4 provides a schematic illustration of one embodiment of a computer system 400 that can perform the methods of the invention, as described herein, and/or can function as a user computer (on which a user interface is displayed and/or a configurator runs, a server computer (which might be an application server for the enterprise application, a database server, a web server, a server for a configurator application) and/or the like. It should be noted that FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown comprising hardware elements that can be electronically coupled via a bus 405 (or may otherwise be in communication, as appropriate). The hardware elements can include one or more processors 410, including without limitation one or more general-purpose processors and/or one or more special-purpose processors (such as digital signal processing chips, graphics acceleration chips, and/or the like); one or more input devices 415, which can include without limitation a mouse, a keyboard and/or the like; and one or more output devices 420, which can include without limitation a display device, a printer and/or the like.

The computer system 400 may further include (and/or be in communication with) one or more storage devices 425, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 400 might also include a communications subsystem 430; which can include without limitation a modem, a network card (wireless or wired), an infra-red communication device, and/or the like), a wireless communication device and/or chipset (such as a Bluetooth™ device, an 802.11 device, a WiFi device, a WiMax device, cellular communication facilities, etc.). The communications system 430 may permit data to be exchanged with a network (such as the network 610 described below), and/or any other devices described herein. In many embodiments, the computer system 400 will further comprise a working memory 435, which can include a RAM or ROM device, as described above.

The computer system 400 also can comprise software elements, shown as being currently located within the working memory 435, including an operating system 440 and/or other code, such as one or more application programs 445, which may comprise computer programs of the invention (such as a configurator program, an enterprise application, a database server and/or client, a web server and/or browser, etc.) and/or may be designed to implement methods of the invention, as described herein. Merely by way of example, one or more procedures described with respect to the method(s) discussed above might be implemented as instructions executable by a computer (and/or a processor within a computer). A set of these instructions might be stored on a computer-readable storage medium, such as the storage device(s) 425 described above. In some cases, the storage medium might be incorporated within a computer system, such as the system 400. In other embodiments, the storage medium might be separate from a computer system (i.e., a removable medium, such as a compact disc, etc.), such that the storage medium can be used to program a generic computer with the instructions stored thereon. These instructions might take the form of executable code, which is executable by the computer system 400 and/or might take the form of installable code, which, upon installation on the computer system 400 (e.g., using any of a variety of generally available installation programs, compression/decompression utilities, etc.) then takes the form of executable code.

It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

In one aspect, the invention employs a computer system (such as the computer system 400) to perform methods of the invention. According to a set of embodiments, some or all of the procedures of such methods are performed by the computer system 400 in response to processor 410 executing one or more sequences of one or more instructions (which might be incorporated into the operating system 440 and/or other code, such as an application program 445) contained in the working memory 435. Such instructions may be read into the working memory 435 from another machine-readable medium, such as one or more of the storage device(s) 425. Merely by way of example, execution of the sequences of instructions contained in the working memory 435 causes the processor(s) 410 to perform one or more procedures of the methods described herein.

The terms "machine readable medium" and "computer readable medium," as used herein, refer to any medium that participates in providing data that causes a machine (e.g., a computer) to operation in a specific fashion. In an embodiment implemented using the computer system 400, various machine-readable media might be involved in providing instructions to processor(s) 410 for execution. In many implementations, a machine-readable medium is a physical and/or tangible medium. Such a medium may take many forms, including but not limited to, non-volatile media, volatile media, and transmission media. Non-volatile media includes, for example, optical or magnetic disks, such as the storage device(s) 425. Volatile media includes, without limitation dynamic memory, such as the working memory 435. Transmission media includes, without limitation, coaxial cables, copper wire and fiber optics, including the wires that comprise the bus 405, as well as the various components of the communication subsystem 430 (and/or the media by which the communications subsystem 430 provides communication with other devices). Hence, transmission media can also take the form of waves, including without limitation radio, acoustic and/or light waves, such as those generated during radio-wave and infra-red data communications.

Common forms of physical and/or tangible machine-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to the processor(s) 410 for execution. Merely by way of example, the instructions may initially be carried on a magnetic disk and/or optical disc of a remote computer. The remote computer might load the instructions into its dynamic memory and send the instructions as signals over a transmission medium. These signals, which might be in the form of electromagnetic signals, acoustic signals, optical signals and/or the like, are all examples of carrier waves on which instructions can be encoded, in accordance with various embodiments of the invention.

The communications subsystem 430 (and/or components thereof) generally will receive the signals, and the bus 405 then might carry the signals (and/or the data, instructions, etc. carried by the signals) to the working memory 435, from which the processor(s) 405 retrieves and executes the instructions. The instructions received by the working memory 435 may optionally be stored on a storage device 425 either before or after execution by the processor(s) 410.

Figure 5:
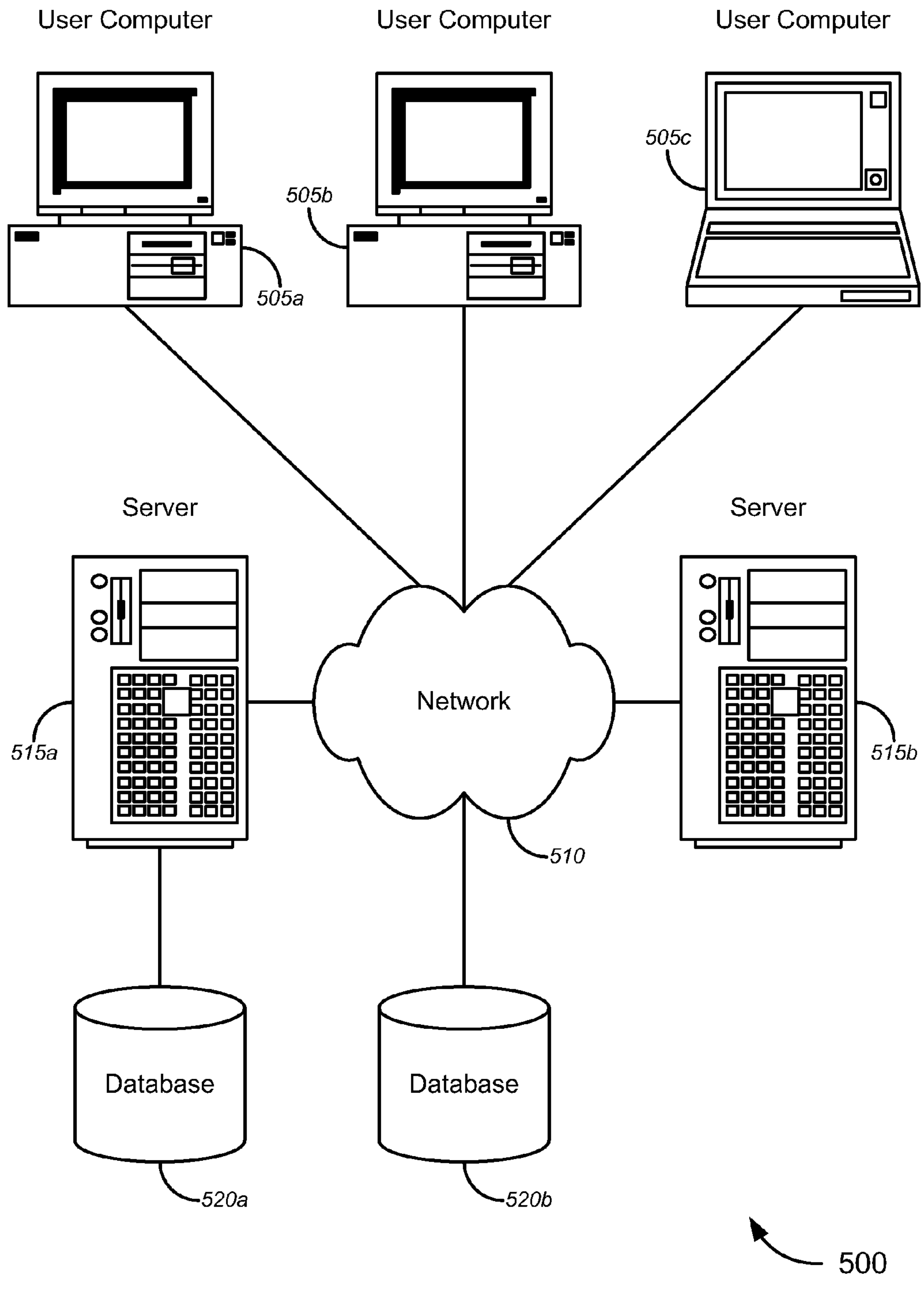
FIG. 5 is a block diagram illustrating a networked system of computers that can be used in accordance with various embodiments of the invention.

A set of embodiments comprises systems for configuring an enterprise application, such as by defining one or more data structures used by the enterprise application. Merely by way of example, FIG. 5 illustrates a block diagram of a system 500 that can be used in accordance with one set of embodiments. The system 500 can include one or more user computers 505. The user computers 505 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 505 can also have any of a variety of applications, as described above. Alternatively, the user computers 505 can be any other electronic device, such as a thin-client computer, Internet-enabled mobile telephone, and/or personal digital assistant, capable of communicating via a network (e.g., the network 510 described below) and/or displaying and navigating web pages or other types of electronic documents. Although the exemplary system 500 is shown with three user computers, any number of user computers can be supported.

Certain embodiments of the invention operate in a networked environment, which can include a network 510. The network 510 can be any type of network familiar to those skilled in the art that can support data communications using any of a variety of commercially-available protocols, including without limitation TCP/IP, SNA, IPX, AppleTalk, and the like. Merely by way of example, the network 510 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 515. Each of the server computers 515 may be configured with an operating system including without limitation any of those discussed above, as well as any commercially-available server operating systems. Each of the servers 515 may also be running one or more applications, which can be configured to provide services to one or more clients 505 and/or other servers 515.

Merely by way of example, one of the servers 515 may be a web server, which can be used, merely by way of example, to process requests for web pages or other electronic documents from user computers 505. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 505 to perform methods of the invention.

The server computers 515, in some embodiments, might include one or more file and or/application servers, which can include one or more applications (such as an enterprise application, a configurator application, etc.) accessible by a client running on one or more of the user computers 505 and/or other servers 515. Merely by way of example, the server(s) 515 can be one or more general purpose computers capable of executing programs or scripts in response to the user computers 505 and/or other servers 515, including without limitation web applications (which might, in some cases, be configured to perform methods of the invention, to provide a user interface for a configurator application, etc.). Merely by way of example, a web application can be implemented as one or more scripts or programs written in any programming language, such as Java™, C, C#™ or C++, and/or any scripting language, such as Perl, Python, or TCL, as well as combinations of any programming/scripting languages. The application server(s) can also include database servers, including without limitation those commercially available from Oracle, Microsoft, Sybase™, IBM™ and the like, which can process requests from database clients running on a user computer 505 and/or another server 515. In some embodiments, an application server can create web pages dynamically for displaying information in accordance with embodiments of the invention, such as for displaying a user interface for a configurator application, receiving data via the user interface, etc. Data provided by an application server may be formatted as web pages (comprising HTML, Javascript, etc., for example) and/or may be forwarded to a user computer 505 via a web server (as described above, for example). Similarly, a web server might receive web page requests and/or input data from a user computer 505 and/or forward the web page requests and/or input data to an application server.

In accordance with further embodiments, one or more servers 515 can function as a file server and/or can include one or more of the files necessary to implement methods of the invention incorporated by an application running on a user computer 505 and/or another server 515. Alternatively, as those skilled in the art will appreciate, a file server can include all necessary files, allowing such an application to be invoked remotely by a user computer 505 and/or server 515. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 520. The location of the database(s) 520 is discretionary: merely by way of example, a database 520*a* might reside on a storage medium local to (and/or resident in) a server 515*a* (and/or a user computer 505). Alternatively, a database 520*b* can be remote from any or all of the computers 505, 515, so long as it can be in communication (e.g., via the network 510) with one or more of these. In a particular set of embodiments, a database 520 can reside in a storage-area network ("SAN") familiar to those skilled in the art. (Likewise, any necessary files for performing the functions attributed to the computers 505, 515 can be stored locally on the respective computer and/or remotely, as appropriate.) In one set of embodiments, the database 520 is a relational database, such as an Oracle database, that is adapted to store, update, and retrieve data in response to SQL-formatted commands. The database might be controlled and/or maintained by a database server, as described above, for example. The database, in an aspect, might be configured to store one or more tables used by an enterprise application and/or generated/modified by a configurator program.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method for configuring an enterprise application for an organization, the method comprising:

generating, with one or more processors of one or more computer systems, a user interface of a first application to facilitate user-selectable options to configure the enterprise application to operate in accordance with specified relationships of business units in a structural hierarchy of the organization and of business functions specified for the business units;

receiving, at the one or more computer systems, first input defining characteristics of the business units and provided via a first subset of the user-selectable options of the user interface of the first application, the first application having access to a database storing data structures used by the enterprise application, each business unit in the business units being a discrete entity within the organization, where the first input comprises indications of:

a first business unit of the business units and a first geographical location corresponding to the first business unit; and a second business unit of the business units and a second geographical location corresponding to the second business unit;

receiving, at the one or more computer systems, second input defining the business functions and provided via a second subset of the one or more of the user-selectable options of the user interface of the first application, each business function in the business functions corresponding to a business unit in the business units and being a set of one or more tasks performed by the corresponding business unit, where the second input comprises indication of a first business function specified for the first business unit;

receiving, at the one or more computer systems, third input defining a business function agency relationship and provided via a third subset of the one or more of the user-selectable options of the user interface of the first application, the business function agency relationship specifying a client relationship between the first business function provided by the first business unit and the second business unit so that the first business unit performs the first business function on behalf of the second business unit;

receiving, at the one or more computer systems, fourth input specifying a control that limits application of the business function agency relationship between the first business unit and the second business unit, the control corresponding to a service level agreement that limits application of the business function agency relationship, the fourth input comprising submission of a document via the user interface;

parsing, with the one or more processors of the one or more computer systems, the document to ascertain one or more requirements for the enterprise application to operate in accordance with the business function agency relationship, the one or more requirements comprising one or a combination of a first requirement requiring performance of the first business function on behalf of the second business unit within a first time, a second requirement requiring performance of the first business function on behalf of the second business unit in a specified manner, and a third requirement requiring automatic reporting of the control;

customizing, with the one or more processors of the one or more computer systems, the enterprise application using the first application to operate in accordance with the business function agency relationship and the one or more requirements of the control limiting application of the business function agency relationship between the first business unit and the second business unit in the database, the customizing the enterprise application comprising:

configuring a set of one or more database tables of the data structures based on the business function agency relationship with customization data specifying the client relationship between the first business function for the first business unit and the second business unit; and configuring the enterprise application to process a transaction based on retrieving the customization data from the database to selectively route the transaction using the control to the first business unit when the business function agency relationship governs the transaction and to another business unit when the business function agency relationship does not govern the transaction; and subsequent to the customizing the enterprise application, operating, by the one or more computer systems, the enterprise application in accordance with the business function agency relationship and the one or more requirements of the control limiting the application of the business function agency relationship, the operating the enterprise application comprising:

recognizing that the business function agency relationship and the one or more requirements of the control govern a first transaction, and, consequently:

routing the first transaction to the first business unit for performance of the first business function on behalf of the second business unit, and implementing the one or more requirements of the control with respect to the performance of the first business function; and recognizing that the business function agency relationship and the one or more requirements of the control do not govern a second transaction, and, consequently routing the second transaction to the another business unit.

2. The method of claim 1, further comprising:

receiving, at the one or more computer systems, a request for a second business function to be performed for the second business unit;

determining, with the one or more processors associated with the one or more computer systems, that the first business unit should perform the second business function on behalf of the second business unit; and sending, with the one or more processors associated with the one or more computer systems, the request to the first business unit to perform the second business function on behalf of the second business unit.

3. The method of claim 2, further comprising:

implementing, with respect to a performance of the second business function, the control defined with respect to the business function agency relationship.

4. A method for configuring an enterprise application to account for business unit functions, the method comprising:

generating, with one or more processors of one or more computer systems, a user interface of a first application to facilitate user-selectable options to configure the enterprise application to operate in accordance with specified relationships of business units in a structural hierarchy of an organization and of business functions specified for the business units;

receiving, at the one or more computer systems, first input indicating characteristics of the business units and provided via a first subset of the user-selectable options of the user interface of the first application, the first application having access to a database storing data structures used by the enterprise application to process transactions, each business unit in the business units being a discrete entity within a business, the first application different from the enterprise application, where the first input comprises indications of:

a first business unit of the business units and a first geographical location corresponding to the first business unit; and a second business unit of the business units and a second geographical location corresponding to the second business unit;

receiving, at the one or more computer systems, second input defining-business functions and provided via a second subset of the one or more of the user-selectable options of the user interface of the first application, each business function in the business functions corresponding to a business unit in the business units and being a set of one or more tasks performed by the corresponding business unit, where the second input comprises indication of a first business function specified for the first business unit;

receiving, at the one or more computer systems, third input defining a first business function agency relationship and provided via a third subset of the one or more of the user-selectable options of the user interface of the first application, the first business function agency relationship specifying a first client relationship between the first business function of the first business unit and a third business unit of the business units so that the first business unit performs the first business function on behalf of the third business unit;

receiving, at the one or more computer systems, fourth input defining a second business function agency relationship and provided via a fourth subset of the one or more of the user-selectable options of the user interface of the first application, the second business function agency relationship specifying a second client relationship between a second business function of the business functions of the second business unit and the third business unit so that the second business unit performs the second business function on behalf of the third business unit;

receiving, at the one or more computer systems, fifth input indicating one or both of a first control and a second control that respectively limit application of the first business function agency relationship and the second business function agency relationship, where the one or both of the first control and the second control corresponds to a service level agreement that limits application of one or both of the first business function agency relationship and the second business function agency relationship, the fifth input comprising submission of a document via the user interface;

parsing, with the one or more processors of the one or more computer systems, the document to ascertain one or more requirements for the enterprise application to operate in accordance with one or both of the first business function agency relationship and the second business function agency relationship, the one or more requirements comprising one or a combination of a first requirement requiring performance of the first business function or the second business function on behalf of the third business unit within a first time, a second requirement requiring performance of the first business function or the second business function on behalf of the third business unit in a specified manner, and a third requirement requiring automatic reporting of the first control or the second control;

customizing, with the one or more processors of the one or more computer systems, the enterprise application using the first application to operate in accordance with the first business function agency relationship and the first control limiting application of the first business function agency relationship between the first business unit and the third business unit, and the second business function agency relationship and the second control limiting the application of the second business function agency relationship between the second business unit and the third business unit, the customizing the enterprise application comprising:

configuring a set of one or more database tables of the data structures, based on the first business function agency relationship and the second business function agency relationship, with customization data specifying the first client relationship and the second client relationship; and configuring the enterprise application to process a transaction based on retrieving the customization data to selectively route the transaction based on the first business function agency relationship and the second business function agency relationship and the first control and the second control; and subsequent to the customizing the enterprise application, operating, by the one or more computer systems, the enterprise application in accordance with the first business function agency relationship, the second business function agency relationship, and the one or more requirements, the operating the enterprise application comprising:

recognizing that the first business function agency relationship and the one or more requirements govern a first transaction, and, consequently:

routing the first transaction to the first business unit for performance of the first business function on behalf of the third business unit, and implementing the one or more requirements of the first control with respect to the performance of the first business function; and recognizing that the second business function agency relationship governs a second transaction, and, consequently routing the second transaction to the second business unit.

5. The method of claim 4, wherein the customizing the enterprise application further comprises modifying the set of one or more database tables to account for the first business function agency relationship and the second business function agency relationship.

6. The method of claim 4, further comprising:

causing, with the one or more processors associated with the one or more computer systems, a confirmation to be displayed.

7. The method of claim 4, further comprising receiving a selection of a third business function via the user interface.

8. The method of claim 7, further comprising:

receiving, at the one or more computer systems a third control limiting application of one or both of the first business function agency relationship and the second business function agency relationship, wherein the third control comprises a limitation on performance of the third business function.

9. The method of claim 4, wherein the first business function agency relationship is a related business function relationship, such that a third transaction processed by the first business function in the first business unit is further processed by a second business function in the second business unit.

10. The method of claim 9, further comprising:

identifying, with the one or more processors associated with the one or more computer systems, the third transaction processed by the first business function in the first business unit;

determining, with the one or more processors associated with the one or more computer systems, that the third transaction should be further processed by the second business function based on the related business function relationship; and sending, with the one or more processors associated with the one or more computer systems, a request to the second business unit to perform the second business function to further process the third transaction.

11. The method of claim 4, further comprising:

receiving, at the one or more computer systems a third business function agency relationship between the first business function of the first business unit and the third business unit, and customizing, with the one or more processors associated with the one or more computer systems, the enterprise application using the first application to account in the database for the third business function agency relationship; and wherein the enterprise application processes additional transactions selectively in response to the enterprise application determining that the third business function agency relationship governs the additional transactions.

12. A computer system, comprising:

one or more hardware processors; and one or more non-transitory, computer readable media having encoded thereon a computer program comprising a set of instructions that are executable by the one or more processors to perform one or more operations, the set of instructions comprising:

instructions for generating a user interface of a first application to facilitate user-selectable options to configure an enterprise application to operate in accordance with specified relationships of business units in a structural hierarchy of an organization and of business functions specified for the business units;

instructions for receiving first input indicating characteristics of the business units and provided via a first subset of the user-selectable options of the user interface of the first application, the first application having access to a database storing data structures used by the enterprise application to process transactions, each business unit in the business units being a discrete entity within a business, the first application different from the enterprise application, where the first input comprises indications of:

a first business unit of the business units and a first geographical location corresponding to the first business unit; and a second business unit of the business units and a second geographical location corresponding to the second business unit;

instructions for receiving second input defining business functions and provided via a second subset of the one or more of the user-selectable options of the user interface of the first application, each business function in the business functions corresponding to a business unit in the business units and being a set of one or more tasks performed by the corresponding business unit, where the second input comprises indication of a first business function specified for the first business unit;

instructions for receiving third input defining a first business function agency relationship and provided via a third subset of the one or more of the user-selectable options of the user interface of the first application, the first business function agency relationship specifying a first client relationship between the first business function of the first business unit and a third business unit of the business units so that the first business unit performs the first business function on behalf of the third business unit;

instructions for receiving fourth input defining a second business function agency relationship and provided via a fourth subset of the one or more of the user-selectable options of the user interface of the first application, the second business function agency relationship specifying a second client relationship between a second business function of the business functions of the second business unit and the third business unit so that the second business unit performs the second business function on behalf of the third business unit;

instructions for receiving fifth input indicating one or both of a first control and a second control that respectively limit application of the first business function agency relationship and the second business function agency relationship, where the one or both of the first control and the second control corresponds to a service level agreement that limits application of one or both of the first business function agency relationship and the second business function agency relationship, the fifth input comprising submission of a document via the user interface;

instructions for parsing the document to ascertain one or more requirements for the enterprise application to operate in accordance with one or both of the first business function agency relationship and the second business function agency relationship, the one or more requirements comprising one or a combination of a first requirement requiring performance of the first business function or the second business function on behalf of the third business unit within a first time, a second requirement requiring performance of the first business function or the second business function on behalf of the third business unit in a specified manner, and a third requirement requiring automatic reporting of the first control or the second control;

instructions for customizing the enterprise application using the first application to operate in accordance with the one or more requirements, the first business function agency relationship and the first control limiting the application of the first business function agency relationship between the first business unit and the third business unit and the second business function agency relationship and the second control limiting the application of the second business function agency relationship between the second business unit and the third business unit, the customizing the enterprise application comprising:

configuring a set of one or more database tables of the data structures, based on the first business function agency relationship and the second business function agency relationship, with customization data specifying the first client relationship and the second client relationship; and configuring the enterprise application to process a transaction based on retrieving the customization data to selectively route the transaction based on the first business function agency relationship and the second business function agency relationship and the first control and the second control; and subsequent to the customizing the enterprise application, operating, by the one or more computer systems, the enterprise application in accordance with the first business function agency relationship, the second business function agency relationship, and the one or more requirements, the operating the enterprise application comprising:

recognizing that the first business function agency relationship and the one or more requirements govern a first transaction, and, consequently:

routing the first transaction to the first business unit for performance of the first business function on behalf of the third business unit, and implementing the one or more requirements of the first control with respect to the performance of the first business function; and recognizing that the second business function agency relationship governs a second transaction, and, consequently routing the second transaction to the second business unit.

13. The computer system of claim 12, further comprising instructions for sending one or more web pages for display in a web browser operated by a user, the one or more web pages comprising the user interface.

14. A non-transitory, computer-readable medium having encoded thereon a computer program comprising a set of instructions executable by a processor of a computer system, the non-transitory, computer-readable medium comprising:

instructions for generating a user interface of a first application to facilitate user-selectable options to configure an enterprise application to operate in accordance with specified relationships of business units in a structural hierarchy of an organization and of business functions specified for the business units;

instructions for receiving first input indicating characteristics of the business units and provided via a first subset of the user-selectable options of the user interface of the first application, the first application having access to a database storing data structures used by the enterprise application to process transactions, each business unit in the business units being a discrete entity within a business, the first application different from the enterprise application, where the first input comprises indications of:

a first business unit of the business units and a first geographical location corresponding to the first business unit; and a second business unit of the business units and a second geographical location corresponding to the second business unit;

instructions for receiving second input defining business functions and provided via a second subset of the one or more of the user-selectable options of the user interface of the first application, each business function in the business functions corresponding to a business unit in the business units and being a set of one or more tasks performed by the corresponding business unit, where the second input comprises indication of a first business function specified for the first business unit;

instructions for receiving third input defining a first business function agency relationship and provided via a third subset of the one or more of the user-selectable options of the user interface of the first application, the first business function agency relationship specifying a first client relationship between the first business function of the first business unit and a third business unit of the business units so that the first business unit performs the first business function on behalf of the third business unit;

instructions for receiving fourth input defining a second business function agency relationship and provided via a fourth subset of the one or more of the user-selectable options of the user interface of the first application, the second business function agency relationship specifying a second client relationship between a second business function of the business functions of the second business unit and the third business unit of the business units so that the second business unit performs the second business function on behalf of the third business unit;

instructions for receiving fifth input indicating one or both of a first control and a second control that respectively limit application of the first business function agency relationship and the second business function agency relationship, where the one or both of the first control and the second control corresponds to a service level agreement that limits application of one or both of the first business function agency relationship and the second business function agency relationship, the fifth input comprising submission of a document via the user interface;

instructions for parsing the document to ascertain one or more requirements for the enterprise application to operate in accordance with one or both of the first business function agency relationship and the second business function agency relationship, the one or more requirements comprising one or a combination of a first requirement requiring performance of the first business function or the second business function on behalf of the third business unit within a first time, a second requirement requiring performance of the first business function or the second business function on behalf of the third business unit in a specified manner, and a third requirement requiring automatic reporting of the first control or the second control;

instructions for customizing the enterprise application using the first application to operate in accordance with the one or more requirements, the first business function agency relationship and the first control limiting the application of the first business function agency relationship between the first business unit and the third business unit and the second business function agency relationship and the second control limiting the application of the second business function agency relationship between the second business unit and the third business unit, the customizing the enterprise application comprising:

configuring a set of one or more database tables of the data structures, based on the first business function agency relationship and the second business function agency relationship, with customization data specifying the first client relationship and the second client relationship; and configuring the enterprise application to process a transaction based on retrieving the customization data to selectively route the transaction based on the first business function agency relationship and the second business function agency relationship and the first control and the second control; and subsequent to the customizing the enterprise application, operating, by the computer system, the enterprise application in accordance with the first business function agency relationship, the second business function agency relationship, and the one or more requirements, the operating the enterprise application comprising:

recognizing that the first business function agency relationship and the one or more requirements govern a first transaction, and, consequently:

routing the first transaction to the first business unit for performance of the first business function on behalf of the third business unit, and implementing the one or more requirements of the first control with respect to the performance of the first business function; and recognizing that the second business function agency relationship governs a second transaction, and, consequently routing the second transaction to the second business unit.

15. The non-transitory, computer-readable storage medium of claim 14, wherein the enterprise application comprises the computer program.

16. The non-transitory, computer-readable storage medium of claim 14, wherein the computer program is integrated with a configuration utility for the enterprise application.

17. The non-transitory, computer-readable storage medium of claim 16, wherein the configuration utility is an installation program for the enterprise application.

* * * * *